United States Patent [19]

Johnson, Jr. et al.

[11] 4,127,878

[45] Nov. 28, 1978

[54] MAGNETIC TAPE RECORDER/REPRODUCER FOR RATIO RECORDING WITH SYNCHRONIZED INTERNAL AND EXTERNAL CLOCK RATES

[75] Inventors: Clark E. Johnson, Jr., Weston; Eugene P. Johnson, Arlington, both of Mass.

[73] Assignee: Micro Communications Corporation, Waltham, Mass.

[21] Appl. No.: 700,521

[22] Filed: Jun. 28, 1976

Related U.S. Application Data

[63] Continuation-in-part of Ser. No. 644,083, Dec. 24, 1975, abandoned.

[51] Int. Cl.² ............................................. G11B 5/09
[52] U.S. Cl. ................................................... 360/51
[58] Field of Search ............. 360/51, 44; 340/347 DD

[56] References Cited

U.S. PATENT DOCUMENTS

| 3,080,487 | 3/1963 | Mellott et al. | 360/51 |
| 3,810,234 | 5/1974 | Monett | 360/51 |

Primary Examiner—Vincent P. Canney
Attorney, Agent, or Firm—Jacobs & Jacobs

[57] ABSTRACT

A data processing system which synchronizes an internal clock with an external clock. The system can be incorporated as part of a magnetic reproducer apparatus or magnetic recorder apparatus. The recorder/reproducer apparatus utilizes ratio encoding schemes to convert conventional data into encoded data to be recorded onto a magnetic medium. It can also read the encoded data from a magnetic medium and convert it back into conventional data. In either case, the synchronized internal clock is utilized as the time base for the ratio encoding.

29 Claims, 6 Drawing Figures

MAGNETIC TAPE RECORDER/REPRODUCER FOR RATIO RECORDING WITH SYNCHRONIZED INTERNAL AND EXTERNAL CLOCK RATES

This application is a continuation-in-part application of copending application Ser. No. 644,083, filed on Dec. 24, 1975 and entitled "Magnetic Tape Recorder/Reproducer for Ratio Recording with Synchronized Internal and External Clock Rates", now abandoned.

This invention relates to the processing of digital encoded data, and more particularly to a reproducing and recording apparatus utilizing the ratio encoding of data.

BACKGROUND OF THE INVENTION

There are numerous well known methods of encoding data for use in conjunction with a magnetic recording medium. One such method utilizes a binary ratio-encoding scheme involving pulse-width modulation of the digital information within a fixed time interval. In an article entitled "Ratio Recording for Lower Cassette Recording Costs" by Edgar Wolf, which appeared on page 76, of *Computer Design* for December 1972, the principles of ratio recording are succinctly described. By virtue of pulse width modulation, a binary logic ONE is indicated by a high level pulse having the width of ⅓ of a bit cell or bit time interval. A binary logic ZERO is represented by a pulse width of ⅔ of a bit interval. Since the pulse representing either a ONE or a ZERO has its leading edge occurring at the beginning of the bit time interval, a space of ⅔ or ⅓, respectively, of the bit time interval appears between the pulse and the next commencing bit cell.

By encoding the digital information using a ratio encoding scheme, it is possible to magnetize the recording medium in a first direction during the existence of the pulse, and magnetize the recording medium in a second direction for the space between the pulse and the end of the time interval. Utilizing ratio encoding schemes, a less expensive transport can then be used and reduced costs of recording and reading can be achieved. The data encoded by the ratio encoding scheme can be referred to as a self-clocking, serial data stream wherein the width of the pulse determines the binary ONE or ZERO and the time interval between the leading edge of a binary bit pulse in one cell and the leading edge of a binary bit pulse in the next consecutive cell defines the bit cell or time interval for the bit. This period $t$ implies the clock rate $1/t$. Thus, for example, if the bit cell interval is three milliseconds, the clock rate implied is 333 bits per second.

Generally, data coming from a computer or other source of information has its ONEs and ZEROs appearing as a constant level during a complete time interval or bit cell. The pulses are of equal widths and occur at a fixed clock time interval. This conventional data format must of necessity be generated in cooperation with a separate time base which causes each of the binary bits of information to be of equal duration. Such conventional data must be separated into a data signal appearing on one channel, and a separate external clock rate signal on another channel in order to be consistently recognizable, because the required timing information generally cannot be derived or reconstructed from the conventional data stream along. Thus, a minimum of two electrical signals are required for a conventional binary serial data transmission.

In the ratio encoding method, the separable parts of such a conventional data transmission are combined so that the data information as well as the external clock information can be transmitted coherently through a single binary serial channel. The hardware economy thus realized becomes apparent when the transmission medium is assumed, for example, to be a single-channel, binary, serial magnetic-tape recorder/reproducer system wherein blocks of digital data are recorded in conjunction with some physically arbitrarily real-time process and then are read out later in non-real time for subsequent analysis or processing. These two signals are synthesized by interlacing the external clock rate signal with the data in the form of pulse width modulated pulses. The two-channel information which is introduced in parallel to the ratio-encoding device is converted into a self-clocking, serial data stream on a single channel. The single-channel, ratio-encoded data can now be recorded onto a recording medium. Conversely, when reading information from a recording medium, the self-clocking, ratio-encoded information is formulated back into two separate channels, one of which includes the clock signal and the other of which includes the data in its conventional pulsed form having equal pulse widths for its ONE's and ZERO's.

In U.S. Pat. No. 2,887,679 entitled, "Pulse Width Memory Unit," issued May 19, 1959 to George B. Greene, a magnetic tape reader/recorder is described which uses the system of ratio encoding. In another U.S. Pat. No. 3,720,927 entitled "Speed Insensitive Reading and Writing Apparatus for Digital Information" issued Mar. 13, 1973 to Edgar Wolf, there is shown additional apparatus for reading and writing information onto a magnetic medium using ratio encoding techniques.

In each of the cases, it is necessary for the recorder/reproducer apparatus to combine a clock signal with the conventional data. Since the conventional data must of necessity have been generated in conjunction with a parent time base, it is necessary for the clock signal which is utilized in the ratio encoding scheme to be the same as the clock used as the time base for the conventional data stream.

In order to achieve this, it generally has been necessary that a recording system utilizing the ratio-encoding format originate the clock signal which synchronizes serial data introduced into the recorder. Or else, if an external clock is utilized, the frequency excursion of the clock, either intentional or caused by unavoidable environmental influences, must be substantially negligible and, in addition, the internal waveform generation process of the recorder must be accurately tuned to the incoming clock frequency in order to generate waveforms for recording which are subsequently, in the readout process, reliably distinguishable with regard to the binary sense of individual bits constructed as described above in self-clocking ratio format, just as it would be if the clock frequency were internally generated.

To accomplish this, previously described ratio-recording techniques have the serious drawback that the user of the peripheral magnetic recorder/reproducer must design his system so that the clock of the computer and the clock of the peripheral equipment correspond with each other. If the clock signals differ in their pulse rate, the reading or recording of the information will be impaired and the information will be distorted.

SUMMARY OF THE INVENTION

It is therefore an object of the present invention to provide a data processing system adapted to accept, within a range of clock rates, an external clock signal and a co-synchronous data signal.

It is another object of the present invention to provide a data processing system which permits the use of a source of data having one clock rate and a recorder/reproducer with another clock rate, and permitting synchronization of the two clock rates.

Another object of the present invention is to provide an apparatus which provides ratio encoding utilizing a variable internal clock signal which is synchronized to the external clock rate signal contained within the data stream.

Yet a further object of the present invention is to provide a magnetic recorder which receives conventional data together with an external clock rate, and ratio encodes the data into a self-clocking signal-channel data stream utilizing an internal clock signal which is synchronized to the external clock signal.

Yet a further object of the present invention is to provide a magnetic reader which reads ratio encoded data, extracts the data signals and the clock signals from the encoded data, and converts the data into a conventional form by combining it with an internal clock signal synchronized to the external clock signal.

Yet another object of the present invention is to provide a method of encoding entering data having a time base correlated to an external clock rate, and providing an output signal wherein the data is correlated to an internal clock rate signal, with the internal clock rate signal being synchronized to the external clock rate signal.

Still another object of the present invention is to provide a magnetic recording apparatus which provides a very high dynamic range permitting data to be recorded at a data rate varying over an extremely wide range.

Still a further object of the present invention is to provide a magnetic reading/recording apparatus which continues operating despite an occasional miss of an incoming clock pulse or the temporary absence of an incoming signal.

These objects are achieved in accordance with a preferred embodiment of the present invention wherein the data processing system comprises a clock means for generating an internal, variable rate clock signal. A comparator means receives an external clock signal and produces an error signal indicative of the difference between the rate of the internal clock signal and the rate of the external clock signal. A control means responds to the error signal and varies the rate of the internal clock signal to synchronize its rate with the rate of the external clock signal. An interface means is included which converts between a first signal containing a self-clocked, single-channel, ratio encoded data stream and a second signal containing dual channels, with a timing signal on one channel and a time-correlated data stream on the other channel. The interface means utilizes the synchronized internal clock signals for the conversion between the first and second signals.

The clock means utilizes a voltage controlled oscillator, and the control means includes a filter connected to the input of the VCO. The comparator means utilizes a phase comparator which receives both the external clock signal and the output of the VCO and produces the error signal.

In one embodiment of the invention, the data processing system forms a part of a magnetic recorder which includes means for receiving from an external source the time-correlated stream. The time base utilized for such data stream is the external clock signal. The interface means includes a waveform synthesizer which receives both the synchronized internal clock signal from the clock means and the time-correlated data stream from the receiving means. The synthesizer converts these signals to the aforementioned first signal, which is the self-clocked, single-channel, ratio encoded data stream. This first signal utilizes the synchronized internal clock signal as its self-clocking signal. As a magnetic recorder, it takes conventional data and extracts the clock signal from it, utilizing that external clock signal to synchronize an internal clock signal. The internal clock signal is then synthesized with the conventional data to form the ratio encoded data.

In an another embodiment, the data processing system forms a part of a magnetic reader which comprises recovery means for receiving the aforementioned first signal from a recording medium and transforms the first signal into an external clock signal and an externally-timed, ratio-encoded data signal. The interfacing includes conversion means which receives both the synchronized internal clock signals from the clock means, and the externally-timed, ratio-encoded data signal. The conversion means converts these signals to the time-correlated data stream of the aforementioned second signal. The time used in such data stream is the synchronized internal clock signal. The synchronized internal clock signal itself forms the timing signal which is part of the aforementioned second signal. In such magnetic reader, the ratio encoded signal is read and separated into its clock and data portions. The clock is then utilized to synchronize an internal clock which is then combined with the extracted data to provide the data in a conventional form.

BRIEF DESCRIPTION OF THE DRAWINGS

Other objects and many of the attendant advantages of the invention will be readily appreciated and better understood by reference to the following detailed description when considered in connection with the accompanying drawings in which like reference numerals designate like parts throughout the figures thereof and wherein.

DESCRIPTION OF THE PREFERRED EMBODIMENT

The expression "ratio encoding" as employed herein will generally refer to the ratio between two parts of a time period which cooperatively constitute the whole of a time period and which are respectively defined by the occurrence of different levels of pulses in a multilevel system. The time periods are cells which are generally defined by a sequential clock pulse, and are periods in which a single item of intelligence such as a bit (a ZERO or a ONE) will be represented.

Considering a two-level system by way of example, a ZERO may be represented by the existence of one voltage level for the initial part of a time period and by a second voltage level for the remaining part of the time period, the initial part being greater than one half of the time period and the ratio of the initial part of the remaining part being greater than unity.

To represent a ONE, the first voltage level is maintained for less than one half of the time period so that the aforesaid ratio is less than unity; to represent a ZERO, the first voltage is maintained for more than one half of the time interval. Thus, in accordance with the invention, ONE's and ZERO's are distinguished by timed ratios.

Specifically, in a two level system it is common to provide a ZERO signal by having a higher level voltage for ⅔ of the bit cell and the lower level voltage for the last ⅓ of the bit cell. A ONE is encoded by having the higher level voltage for the first ⅓ of the bit cell and the lower level voltage for the ⅔ of the bit cell.

Such methods of ratio encoding have been described in the aforementioned article and patents. Such ratio encoding has been found useful in connection with magnetic reading and recording apparatus. However, when using such apparatus, the clock signal of the apparatus must be identical to the clock signal of the conventional data being encoded. This has created restrictions on the type of apparatus which can be utilized. To require the two clock rates to be identical places restrictions either on the computer source producing the data or on the reader/recorder encoding the data.

Figure 1:
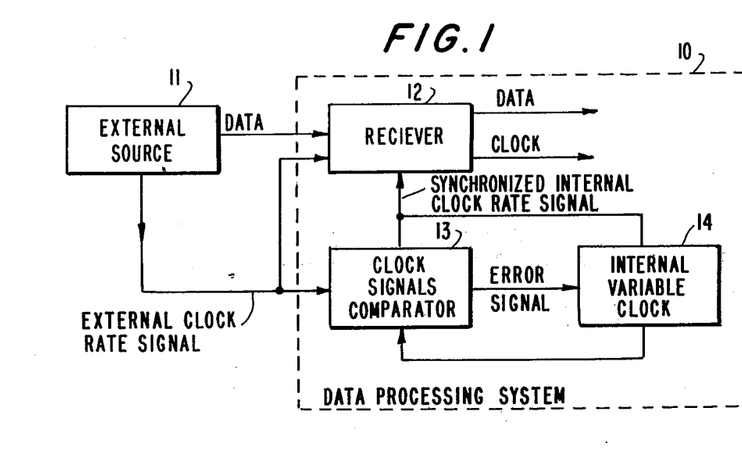
FIG. 1 is a schematic circuit block diagram illustrating a data processing system embodying the present invention.
Figure 3:
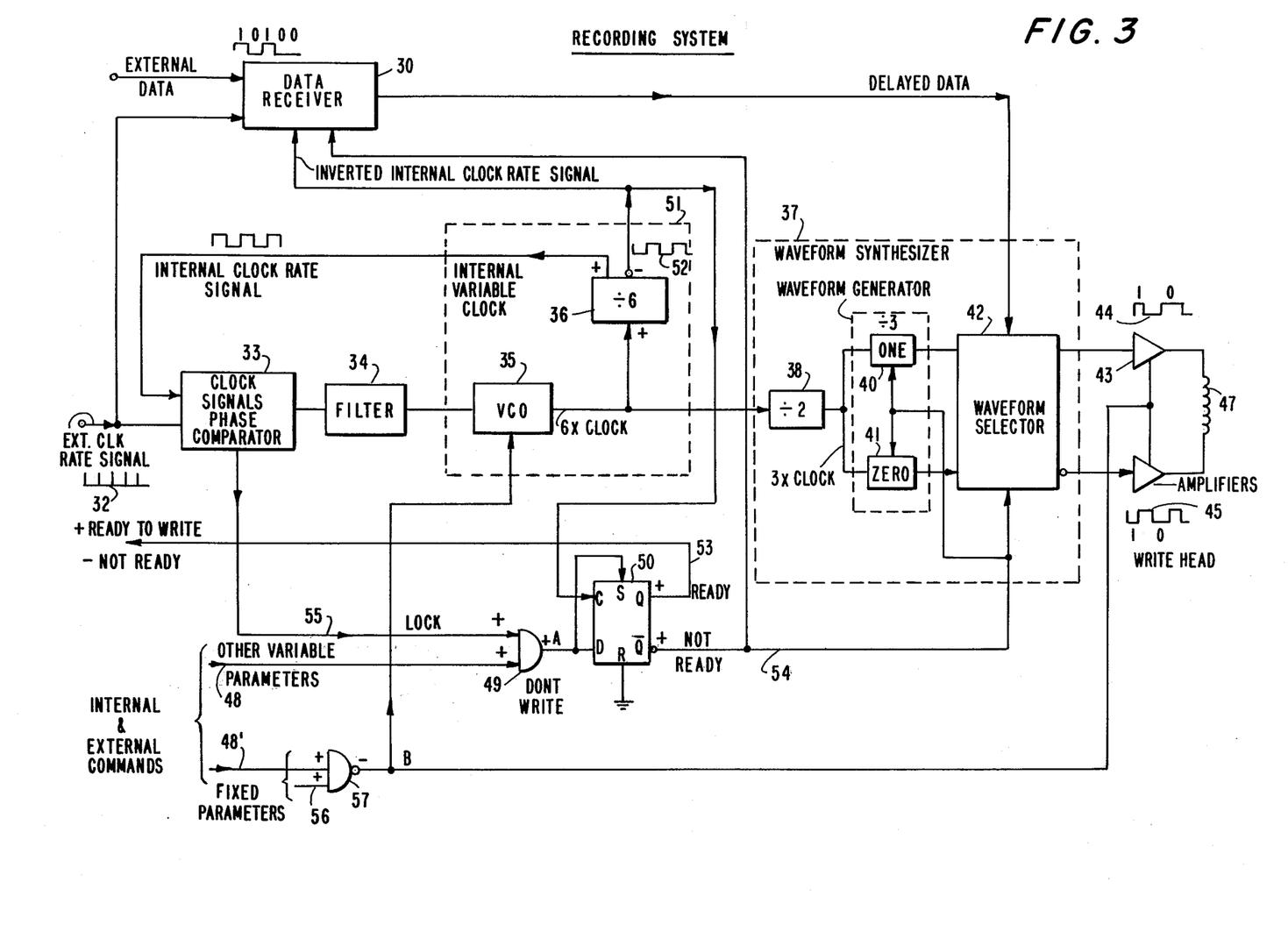
FIG. 3 is a schematic circuit block diagram of a magnetic recording system embodying the present invention.
Figure 5:
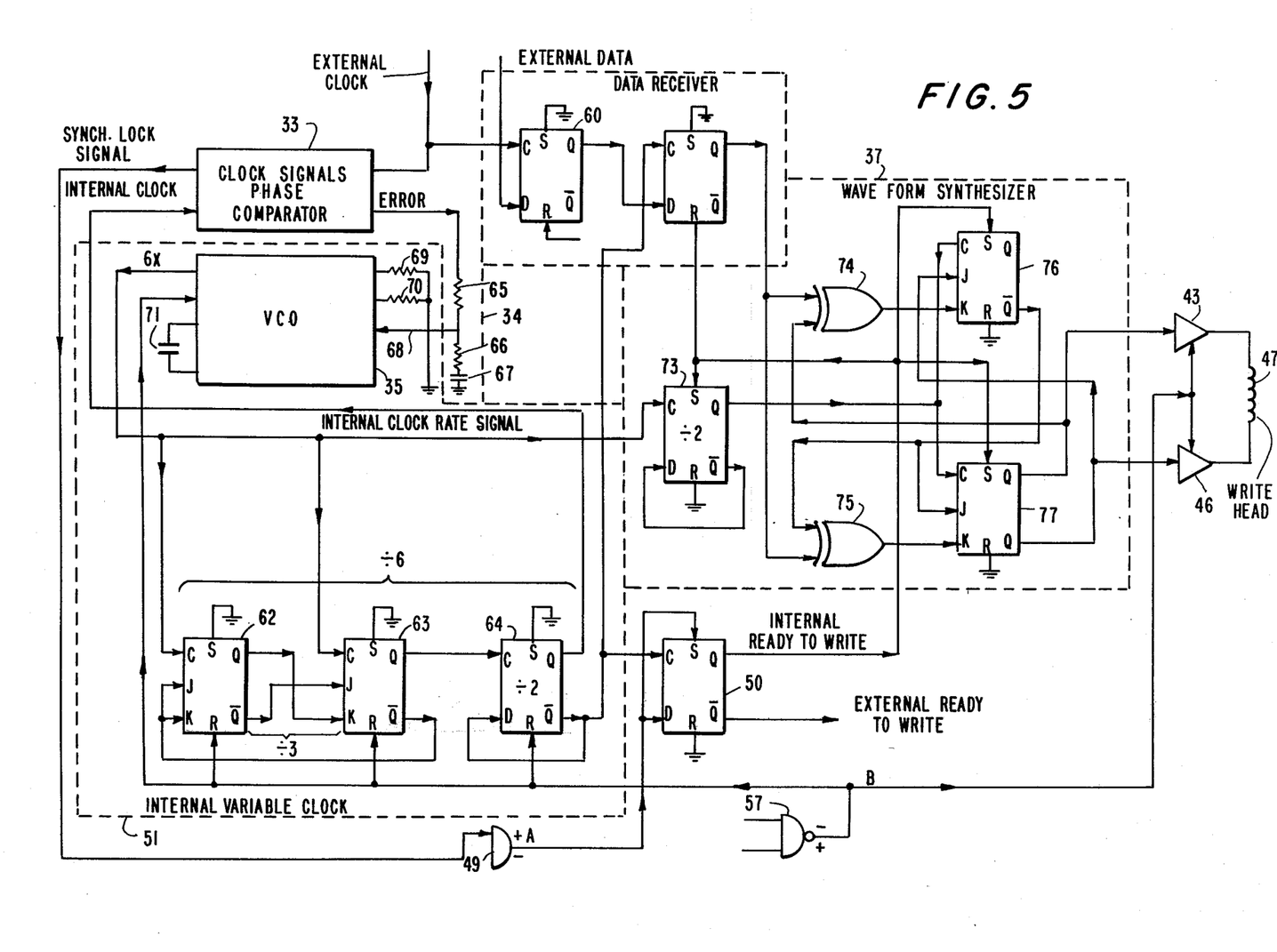
FIG. 5 is a more detailed schematic circuit diagram of the system shown in FIG. 3.
Figure 6:
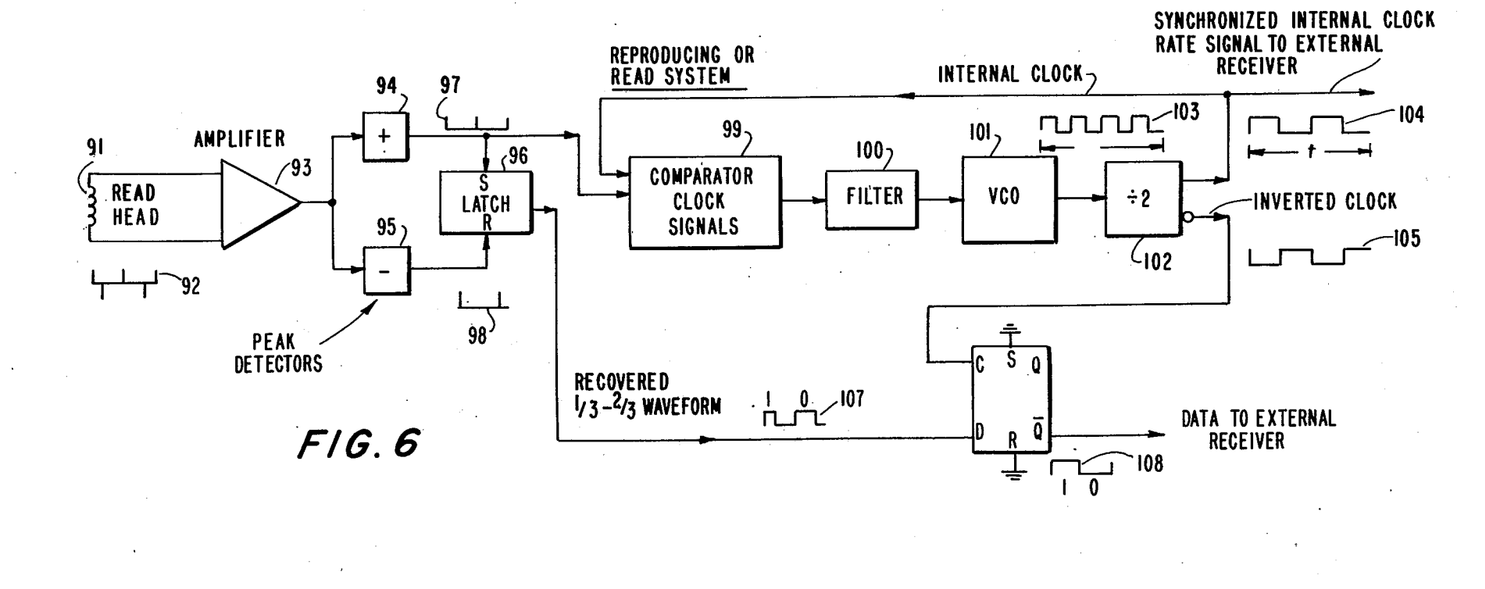
FIG. 6 is a schematic circuit block diagram of a magnetic reading system.

Accordingly, in FIG. 1 there is described a data processing system for synchronizing an internal clock rate with an external clock rate. Such data processing system can be incorporated within a recording apparatus as shown in FIGS. 3 and 5, or within a reading apparatus as shown in FIG. 6. In each case, because of the use of the data processing system, there is provided unique benefits not heretofore achievable with other ratio encoding apparatus.

The data processing system shown in FIG. 1 is essentially a synchronizing system. It can be used to convert encoded data back into conventiontal form or, conventional data into encoded form. As such, the system can receive conventional data which has an inherent time base, and wherein the external clock rate forming the time base can be extracted as a separate signal from the conventional data signal. The data processing system can then synchronize an internal variable clock to the external clock rate, and then use the internal signal to produce a self-clocked, single-channel, ratio-encoded signal. The system may also receive two separate and distinct parallel signals, one representing the data signal and the other representing an external clock rate signal, and after synchronizing the internal clock rate to the external clock signal can produce a pair of parallel output signals, one representing the data signal and the other as the synchronized clock signal. The data processing system may also receive a single-channel, self-clocked, ratio-encoded signal and separate it to produce an output pair of signals, one containing the data and the other containing the synchronized internal signal. Additionally, it may receive a single-channel, self-clocked, serial data signal which had been encoded by using an external clock signal, and produce a single-channel, self-clocked serial data signal which is encoded utilizing the synchronized internal clock signal.

It will thus be appreciated that the data processing system of FIG. 1 can be utilized in numerous types of apparatus and essentially provides for the synchronization of an internal clock signal to an external clock signal for use in a ratio encoding scheme.

Referring now to FIG. 1, the data processing system is shown generally at 10 and within the dotted line. An external source 11 provides a data signal which is coupled to a receiver 12. The data signal has a time base correlated to an external clock rate signal. The external clock rate signal can be separately provided, or can be extracted from the data signal itself, and is one input to a clock signal comparator 13 contained with the data processing system 10. The external source would normally be a computer, or other instrument for generating data.

Within the data processing system 10 there is contained an internal variable clock 14 which produces a clock rate. The output from the variable clock is fed as a second input to the clock signal comparator 13. The comparator 13 provides an error signal which is coupled back to the internal clock 14 to adjust it and cause it to produce an internal clock rate signal which is synchronized with the external clock rate signal. Another output from the internal clock 14 is coupled to the receiver 12 to be combined with the data. The output data from the receiver 12 is then time-correlated to the internal synchronized clock signal. The output data from the receiver 12 is then time-correlated to the internal synchronized clock signal.

Essentially, the data processing system causes the generation of synchronized data and internal clock pulses from unsynchronized external data and clock signals. The frequency of the clock is determined by a voltage, called the error signal, which is proportional to the frequency difference between the two clocks provided to the comparator 13.

Figure 2:
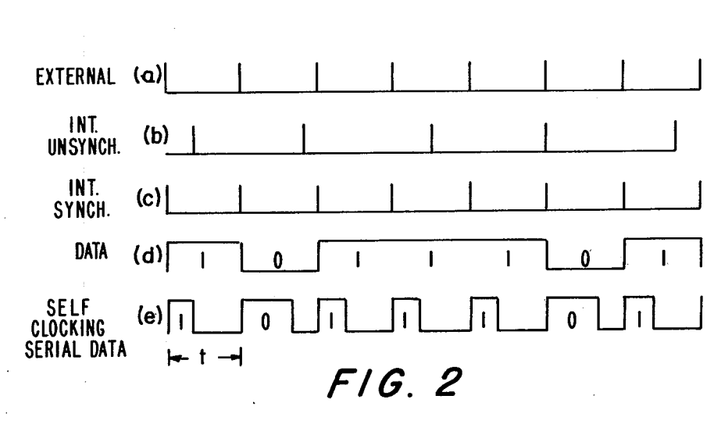
FIG. 2 is a graph of a series of wave forms illustrating an aspect of the operation of the data processing system shown in FIG. 1.

Referring now to FIG. 2, there is shown a series of wave forms associated with FIG. 1. FIG. 2A shows the external clock rate signal which is provided along with the data from the external source. FIG. 2B shows the internal unsynchronized clock rate signal which is initially produced by the internal clock. FIG. 2C shows the internal clock after it has been synchronized with the external clock rate. FIG. 2D shows the incoming conventional NRZ data wherein each of the bits of information occupies a complete bit cell or time interval. Thus, a ONE is represented by a positive level occupying a complete time interval and a ZERO is represented by a negative level occupying a full time interval. FIG. 2E, shows a ratio-encoded self-clocking stream of serial data. Such ratio-encoded signal would not be directly produced by the data processing system of FIG. 1, but is a signal that can be produced by combining the data processing system with the reading/recording apparatus to be hereinafter described. The data bit time interval has been divided into a number of increments, in this case three increments. A binary ONE is represented by a high level pulse occupying ⅓ of the interval and a binary ZERO is represented by a high level pulse occupying ⅔ of the bit interval. A bit interval is shown as t.

Referring now to FIG. 3, there is shown a recording system utilizing the data processing system heretofore described. The external data in conventional form, shown at 31, is received by a data receiver 30. The external clock rate signal, shown at 32, is received at the clock signal comparator, which is shown as a phase comparator 33. The internal variable clock is provided by a voltage controlled oscillator, VCO 35. The VCO actually generates a clock signal six times the interval of the clock rate. This rate is then divided by the divider circuit 36 and fed back as the internal clock rate signal to the phase comparator 33. The phase comparator produces an error signal voltage representative of the difference in pulse rates between the external and internal clock rates. The error signal is sent through a filter 34 which controls the level on the VCO to thereby synchronize the internal clock rate signal with the external clock rate signal. Such synchronization usually takes place within 8-10 clock pulses.

An inverted internal clock rate signal, shown at 52, is taken out of the divider 36 and applied to the data receiver 30 to produce a delayed data signal which is fed into a waveform synthesizer, shown within the dotted lines 37. The synthesizer receives the output from the VCO 35 at 6 times the clock rate and initially divides it by two in the divider 38. The output now representative of three times the clock signal is fed to a waveform generator 39 which includes a pulse generator 40 for the binary level 1 and a pulse generator 41 for the binary level ZERO. The waveform generator 39 effectively divides the pulse interval into three increments and produces the appropriate pulses for the respective ONE and ZERO binary level. The outputs from the pulse generators 40 and 41 are coupled to a waveform selector 42 which receives from the receiver 30 the data delayed by ½ the bit interval. One output of the waveform selector feeds the amplifier 43 and produces the signal shown at 44. This signal is applied to the positive side of a write head 47. The inverted output from the waveform selector passes through the amplifier 46 and produces a waveform shown at 45. This is provided at the negative side of the head 47.

It will therefore be evident, that when the input data is a ONE, a positive going pulse will be sent through the head 47 for ⅓ of a bit and a negative going pulse will be sent through the head for the next ⅔ of the bit interval. On the other hand, for a ZERO data input, a positive pulse will be sent for first ⅔ of a bit interval and a negative pulse will be sent for last ⅓ of the interval.

The recording system shown in FIG. 3 includes additional circuitry to provide safety to the system by ensuring that it will only operate after various conditions have been met. For example, there may be certain internal and external commands relating to the readiness of the system. Such commands can include indications of the proper speed of the tape, sufficient voltage level, proper settings of the recorder., etc. Such variable commands are applied on lines 48 and 48'. Additional fixed parameters can also be applied on line 56. These signals feed the gate 57 which provides a signal B which enables the VCO 35 to begin operating and also enables the amplifiers 43 and 46. The commands on line 48 enable the gate 49 and awaits a lock signal on line 55 indicating that synchronization has been achieved. The output from gate 49 provides an A signal which is sent to a CD flip flop. The A signal provides the input to the data D terminal and the clock C terminal is fed by the inverted internal clock rate signal from the internal variable clock 51. The output provides an enable signal on line 53 indicating that the system is ready to operate. At the same time, it disables the line 54 which had previously prevented the waveform synthesizer and the data receiver 30 from receiving the information. Once the A and B signals are provided, the system is ready to receive information and transform it into a ratio-encoded signal to be recorded utilizing the internal sychronizing clock signal.

It is noted that the circuit of FIG. 3 essentially utilizes the data processing system of FIG. 1 and takes the output at 6 times the clock rate. This is then divided down in the waveform synthesizer to generate the ⅓ and ⅔ pulses during the bit interval time. The waveform selector then selects the proper pulse based upon the data input and provide the pulse to the write head which can magnetically saturate a tape or other recording medium with the information.

Figure 4:
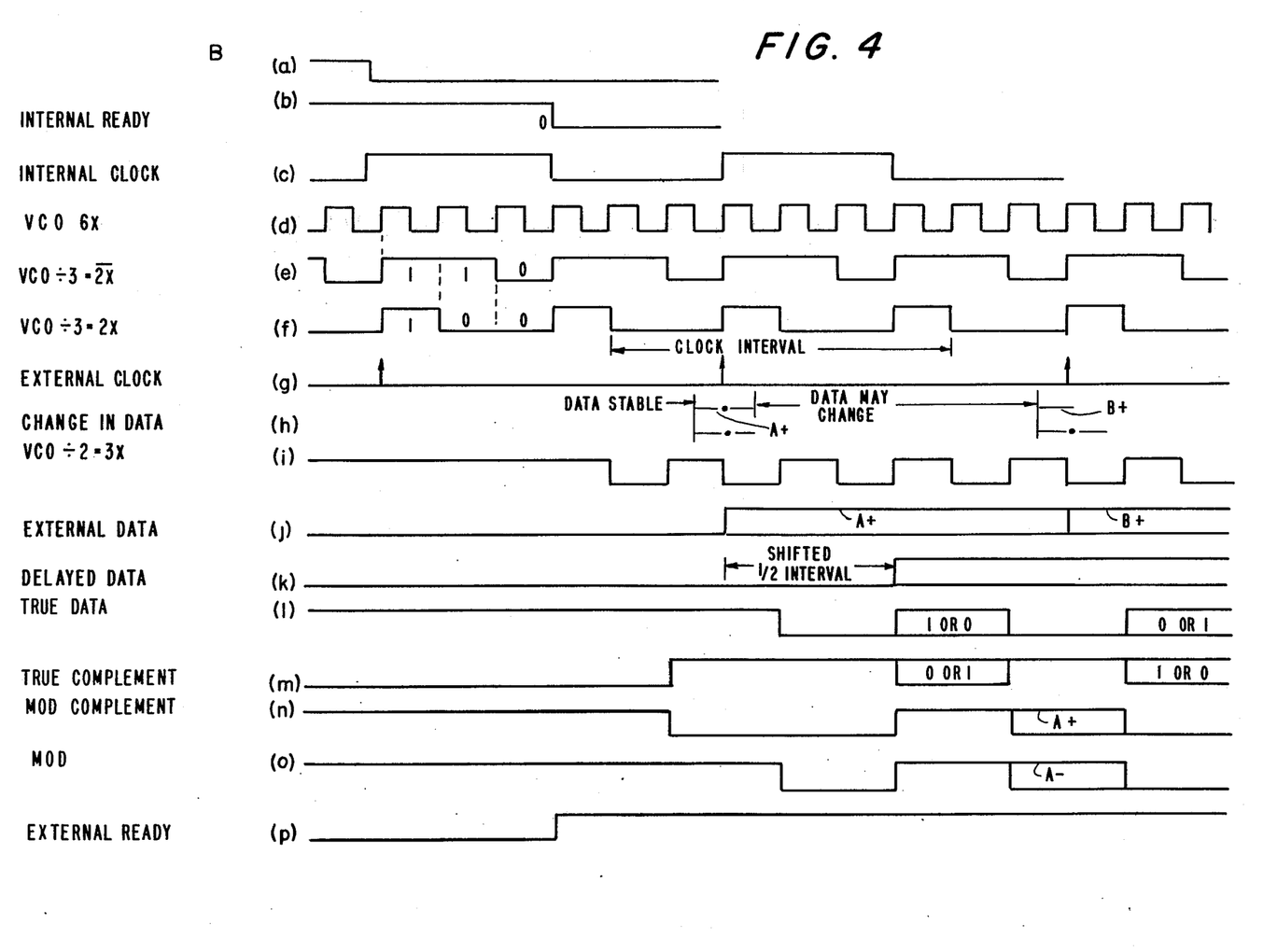
FIG. 4 is a graph of a series of wave forms related to the operation of the circuit shown in FIG. 3.

Referring now to FIG. 4 there are shown a series of graphs which may clarify the waveforms utilized in the circuit of FIG. 3. FIG. 4a is the B signal which is initially turned on as soon as the various internal commands indicate that the sytem is ready. As soon as that signal occurs, it causes the internal clock of FIG. 4c to begin operating. The internal clock includes the VCO which produces a six times clock rate shown in FIG. 4d. The external clock is shown in FIG. 4g and after about 8 to 10 pulses the VCO becomes synchronized with the external clock and the lock signal is produced to indicate an internal ready condition on line 4b and an external ready condition on line 4p.

Some of the various internal signals generated are the VCO signal divided by 2 which produces three times the clock as shown in 4i, and the waveform generators which divide the signal by 3 and produce the two times the clock signal shown in 4f, and the inverted two times clock signal shown in 4e. FIG. 4h shows how the data may actually change during the course of the writing and recording, and shows the various times during which such change may take place. FIG. 4j shows the external data as it initially arrives, and it can be noted that the data occupies a complete time interval. FIG. 4k shows the data shifted at ½ a bit interval as it comes out of the data receiver. The graph 4l shows the data which is to be recorded on a tape, and along with FIG. 4m makes up the current through the write head which determines the pulses to be recorded. The recorded data are then shown in 4n and 4o.

Referring now to FIG. 5, there is shown in detail the recorder circuit as heretofore described in FIG. 3. The external data is received by the data receiver 30, which is shown to comprise a pair of CD flip flops 60 and 61. The internal variable clock includes the VCO which feeds the divide by 6 circuit hereincomprised of three flip flops 62, 63 and 64. The first two, 62 and 63, are shown as JK flip flops, while the last 64, is shown as a CD flip flop. The first two provide a divide by 3 circuit and the last CD flip flop adds the additional divide by 2 to produce the total divide by 6 output.

The inverted output from the CD flip flop 64 is used to feed the data receiver flip flop 61 and also the flip flop 50.

The filter 34 positioned between the phase comparator and the VCO includes the resistor 65 connected in parallel with a resistor 66 and a capacitor 67 to ground. The voltage control occurs at the connection point therebetween as indicated at 68. A pair of resistors 69, 70 and a capacitor 71 are coupled to the VCO as part of an integrated circuit block. The resistor 69 prescribes the lowest frequency of operation of the VCO and the resistor 70 determines the range.

The divide by 2 circuit uses a CD flip flop 73. The waveform synthesizers 37 include a pair of exclusive OR gates 74 and 75 which correspond to the waveform generators shown in FIG. 3. The waveform selector of FIG. 3 includes the JK flip flops 76 and 77, which feed the amplifiers 43 and 46.

The purpose of the filter 34 is to pass the frequencies in the range expected at the voltage controlled oscillator. The input to the filter is a slowly varying DC signal which represents the difference between the two frequencies of the external and internal clocks. If the filter were not present, the system could go into oscillation. With the filter, it controls the input to within a specific expected range.

Referring now to FIG. 6, there is shown the data processing system of FIG. 1 incorporated within a reading apparatus. A read head 91 is magnetically coupled to a magnetic recording medium which carries the digital data message, for example, in the form of a binary, self-clocking, ratio-encoded stream of signals. The read head 91 detects the pulses from the tape. In essence, the pulses appear as differentiated signals shown at 92. By the vary nature of a magnetic recording, the playback signal is the derivative of the recorded signal and, therefore, the information now occurs at the peaks of the recorded signal. The positive peaks of the signal 92 indicate the bit interval, and the negative peaks indicate the pulse width relative to the data information. The output of the read head passes through an amplifier 93 and then the pulses pass through a positive peak detector 94 and a negative peak detector 95. The detector 94 detects the positive pulses shown at 97, while the detector 95 detects the negative pulses and inverts them as shown at 98. The two signals are sent to a latch circuit 96 which combines the signals to recover the wave form shown at 107 in terms of the ratio encoded data stream. The positive peaks of signal 97 are also sent as the external clock signal to the comparator 99. An internal clock represented by a voltage controlled oscillator 101 provides an output which is twice the frequency of the clock rate as shown in FIG. 103. The frequency is divided by 2 and sent as the other input to the comparator 99. The comparator produces an error signal which passes through the filter 100 and controls the level of the VCO 101 to synchronize its output to the external clock signal which was extracted from the magnetic recording.

An inverse or complement of the internal clock signal, shown at 105, is coupled to the input C of the CD flip flop 106. The recovered waveform 107 is sent to the data input D of the CD flip flop 106. The output on $\overline{Q}$, shown at 108, is then the recovered data which is now in its conventional form having a single pulse for each data bit and wherein the pulse occupies a complete bit interval. The pulse 108 is now based upon the synchronized internal clock rate signal. That signal shown in 104 is also utilized as the time output signal.

Utilizing the data processing system including the synchronization circuit as part of the reading apparatus provides unique benefits to such a magnetic reading system. In order to appreciate such benefits it is important to review the prior art methods of recovering the data from its ratio encoded form.

In the prior art, there were generally two ways to recover such data. One involved a digital system and the other involved an anolog system. In the digital system, each time a positive going edge of a ratio encoded signal was detected, it would reset a counter to begin counting upward. When a negative edge of the encoded signal was detected, it would switch over the counter and start counting down. When the next positive bit came along, indicating the beginning of a new interval, the counter was interrogated to see if its count was either positive or negative. If it was left with a positive count, it provided an indication that it counted up longer than it counted down, and it would be a ZERO. If, on the other hand, the counter was negative, indicating that it counted down longer than it counted up, the output would be determined as a ONE.

In the analog method, an analog equivalent of the counter is utilized, namely a capacitor. Thus, a capacitor would be charged positively starting at the positive going edge of the bit and then charged negatively at the negative going edge. At the end of the bit, when the next positive going edge was reached, the capacitor was interrogated. If its net charge was positive, then the data bit was identified as a ZERO. If the net charge was negative, it was identified as a ONE.

In either case, the counter or the capacitor is reset at ZERO at the positive going edge, that is, at the leading edge of each bit. The counter then counts up, or the capacitor charges up, until the negative edge is reached. This will be either in the first half or the second half of the bit interval. When the negative edge occurs, the counter is caused to count down, or the capacitor is caused to charge negatively. When the next bit edge is reached as identified by the next positive going edge, the counter or capacitor is interrogated and its state determines the logical value of the data.

The problem with such prior art systems concerns their limited dynamic range. For example, if the data rate is very slow, then the counter will have to count a very large number of counts before it begins counting downward. Similarly, if a capacitor system is used, the capacitor must be very large so that it is not completely charged during the bit time. Of course, the oscillator driving the counter of the power supply providing the voltage to the capacitor could be reduced so that the charge on the capacitor or the number of counts per unit time on the counter can be reduced. However, if this is carried out, then when the data rate changes to again become very fast, there would exist the problem of "granularity" with the count system, since there would be too few counts in the bit time, and with the capacitor system the voltage would be so low that the detector might not be able to distinguish the voltage from the noise.

Utilizing the system shown in FIG. 6, there is provided a very high dynamic range. While the dynamic range of a capacitor or counter system is typically over a change of clock rate of 10 to 1, utilizing the system shown in FIG. 6, a change in data rate of close to 500 to 1 can be achieved.

An additional benefit obtainable by utilizing the voltage controlled oscillator concerns the occurrence of an occasional miss of a clock pulse from the data source. Generally, with other recording systems, when there occurs a miss of a clock pulse coming into the system, or a defect in the tape, the system cannot compensate for such occasional misses. However, in order to avoid such gaps, it is necessary to be able to generate the clock pulses event when there is a defect on the tape which would prevent a signal from reaching the tape head. Utilizing the voltage controlled oscillator as part of the synchronizing system, such improvement is achieved. The voltage controlled oscillator continues generating clock pulses for a short period of time even when there is no incoming signal. Thus, should there be a defect in the tape, even if there is no incoming signal, the VCO will continue to generate clock pulses for a short period of time. Although, the VCO will suddenly change its output since it will interpret the lack of pulses as an indication that the frequency has suddenly gone way down, nevertheless, such can easily be recontrolled by means of the synchronizing system and no information will be lost since the pulses will continue even during the defect period.

It will therefore be appreciated that there has been described a data processing system including a synchronizing circuit having a phase lock loop which can synchronize an internal clock of a reader/recorder with an external clock. Such data processing system can be utilized as part of either a magnetic reader or magnetic recorder in conjunction with ratio encoding schemes. When utilizing the data processing system of the present invention, unique benefits are obtained including overcoming defects in the tape as well as producing a wider dynamic range. Furthermore, it permits selecting the peripheral equipment and the computer independent of each other and not restricting the type of equipment to require that the two clocks be identical with each other.

There has been disclosed heretofore the best embodiment of the invention presently contemplated. However, it is to be understood that various changes and modifications may be made thereto without departing from the spirit of the invention.

We claim:

1. A data processing system comprising:
   clock means for generating an internal, variable rate clock signal;
   comparator means receiving an external clock signal and producing an error signal indicative of the difference between the rate of the internal clock signal and the rate of the external clock signal;
   control means responsive to said error signal for varying the rate of said internal clock signal to synchronize its rate with the rate of said external clock signal, and
   interface means for converting between a first signal containing a self-clocked, single-channel, ratio-encoded data stream and a second signal containing dual-channels with a timing signal on one channel and a time-correlated data stream on the other channel, said interface means utilizing said synchronized internal clock signal for the conversion between said first and second signals.

2. A data processing system as in claim 1 and wherein said clock means includes a voltage controlled oscillator having an input and an output, said comparator means includes a phase comparator having two inputs and an output, and said control means includes a filter connected between said phase comparator output and said voltage controlled oscillator input, the output from the voltage controlled oscillator being connected as one input to said phase comparator, the other input receiving said external clock signal.

3. A data processing system as in claim 2 and wherein said voltage controlled oscillator produces an output signal which is a multiple of the desired internal clock rate, and further comprising divider means for dividing the rate of the output of the voltage controlled oscillator.

4. A data processing system as in claim 2 and wherein said system is a magnetic recorder and further comprising means for receiving from an external source said time-correlated data stream, the time-used in said correlation being said external clock signal, and wherein said interface means includes a waveform synthesizer receiving the synchronized internal clock signals from said clock means and said time correlated data stream from said receiving means and converting them to said first signal, wherein said first signal utilizes said synchronized internal clock signal for self-clocking.

5. A data processing system as in claim 4 and wherein said waveform synthesizer comprises a dividing circuit means for dividing said synchronized internal clock signal to produce increments of each time interval provided by said clock signal, the number of increments produced being related to the encoding ratio of said first signal, waveform generator means for providing pulses for each of said increments, and waveform selector means receiving said time-correlated data stream and for selecting a desired polarity of pulses for said increments at each time interval in response to said data stream.

6. A data processing system as in claim 5 and wherein said time-correlated data stream contains binary data, said number of increments is three, and the encoding ratio is characterized by a pulse of one-third of an interval for one of the binary values of said data, and a pulse of two-thirds of an interval for the other binary value of said data.

7. A data processing system as in claim 4 and further comprising recording means coupled to said waveform synthesizer for recording the first signal onto a recording medium.

8. A data processing system as in claim 6 and wherein said waveform generator means further comprises first and second pulse generator means each producing a predetermined signal polarity for each of said binary values of data.

9. A data processing system as in claim 8 and wherein each of said pulse generator means includes an exclusive OR gate, and wherein said waveform selector includes multivibrator means associated with each of said exclusive OR gates.

10. A data processing system as in claim 3 and wherein said dividing circuit includes a plurality of multivibrator circuits.

11. A data processing system as in claim 4 and further comprising gating means responsive to both the achieving of the synchronism of said internal clock signal and to other internal command signals, for enabling said waveform synthesizer to operate.

12. A data processing system as in claim 2, wherein said system is a magnetic reader, and further comprising recovery means for receiving said first signal from a recording medium and transforming said first signal into the external clock signal and into an externally-timed, ratio-encoded data signal, and wherein said interface means includes conversion means receiving both the synchronized internal clock signals from said clock means and said externally-timed, ratio-encoded data signal and converting them to said time-correlated data stream, wherein the time used for correlation is said synchronized internal clock signal, and wherein said synchronized internal clock signal forms the timing signal of said second signal.

13. A data processing system as in claim 12 and wherein said receiving means comprises peak detectors for respectively detecting the positive and negative pulses of said received first signal, and a latching means receiving the output from said peak detectors to form said externally-timed, ratio-encoded data signal, and wherein said positive pulses form said external clock signal.

14. A data processing system as in claim 12 and wherein said conversion means comprises inverting means for inverting said synchronized internal clock signal, and a multivibrator receiving said inverted clock signal and said externally-timed, ratio-encoded data signal.

15. A data processing system as in claim 14 and wherein said multivibrator is a CD flip flop whose data input receives said externally-timed, ratio-encoded data signal, and whose clock input receives said inverted clock signal.

16. A magnetic recorder for digital data, comprising receiving means for receiving a time-based data stream having an external clock signal as the time base;
clock means for generating an internal variable-rate clock signal.
comparator means receiving the external clock signal and producing an error signal indicative of the difference between the internal clock rate and the external clock rate;
control means responsive to said error signal for varying the rate of said clock means to synchronize its rate with the rate of said external clock signal, and
waveform synthesizer means receiving the synchronized internal clock signals from said clock means and said time-based data stream from said receiving means, and converting them to a self-clocked, single-channel, ratio-encoded data stream utilizing said synchronized clock signal for the self-clocking.

17. A magnetic recorder as in claim 16 and wherein said clock means includes a voltage controlled oscillator having an input and an output, said comparator means includes a phase comparator having two inputs and an output, and said control means includes a filter connected between said phase comparator output and said voltage controlled oscillator input, the output from said voltage controlled oscillator being connected as one input to said phase comparator, the other input receiving said external clock signal.

18. A magnetic recorder as in claim 17 and wherein said voltage controlled oscillator produces an output signal which is a multiple of the desired internal clock rate, and further comprising divider means for dividing the rate of the output of the voltage controlled oscillator.

19. A magnetic recorder as in claim 16 and further comprising inverting means connected between said clock means and said receiving means for inverting said synchronized internal variable clock signal and applying the inverted signal to said time-based data stream to form a delayed data stream, said delayed data stream being applied to said waveform synthesizer.

20. A magnetic recorder as in claim 16 and wherein said waveform synthesizer comprises a dividing circuit means for dividing said synchronized internal clock signal to produce increments of each time interval provided by said clock signal, the number of increments being related to the encoding ratio of said first signal, waveform generator means for providing pulses for each of said increments, and waveform selector means receiving said time-correlated data stream and for selecting a desired polarity of pulses for said increments at each time interval in response to said data stream.

21. A magnetic recorder as in claim 16 and further comprising recording means coupled to said waveform synthesizer for recording the first signal onto a recording medium.

22. A magnetic reader for ditigal data, comprising:
recovery means for receiving a self-clocked, single channel, ratio-encoded data stream utilizing an external clock signal for the self-clocking, and transforming said received data stream into an external clock signal and into an externally-timed, ratio-encoded data signal;
clock means for generating an internal variable-rate clock signal;
comparator means receivng the external clock signal and producing an error signal indicative of the difference between the internal clock rate and the external clock rate;
control means responsive to said error signal for varying the rate of said clock means to synchronize its rate with the rate of said external clock signal, and
conversion for receiving both the synchronized internal clock signals from said clock means and said externally-timed ratio-encoded data signal and converting them into a time-correlated data stream, wherein the time used for correlation is said synchronized interclock signal.

23. A magnetic reader as in claim 22 and wherein said receiving means comprises peak detectors for respectively detecting the positive and negative pulses of said received first signal, and a latching means receiving the outputs from said peak detectors to form said externally-timed, ratio-encoded data signal, and wherein said positive pulses form said external clock signal.

24. A magnetic reader as in claim 22 and wherein said conversion means comprises inverting means for inverting said synchronized internal clock signal, and a multivibrator receiving said inverted clock signal and said externally-timed ratio-encoded data signal.

25. A magnetic reader as in claim 24 and wherein said multivibrator is a CD flip flop whose data input receives said externally-timed, ratio-encoded data signal, and whose clock input receives said inverted clock signal.

26. A method of processing data, comprising the steps of:
receiving an incoming time-based data signal having an external clock rate as its time base;
generating an internal variable clock rate signal;
comparing said internal clock rate signal with the external clock rate signal to produce an error signal indicative of the difference between said rates;
varying the rate of said internal clock rate signal to synchronize it with said external clock rate signal in response to said error signal; and generating an output signal representative of said incoming data which is time-based on said synchronized internal clock rate signal; and wherein:
said incoming signal is a dual-channel, parallel, clock rate and data signal; and further comprising the steps of:
converting said incoming signal into a single-channel, self-clocked, serial data signal; and
pulse width modulating said serial data wherein a bit interval is determined by the period between leading edges of consecutive pulses, and each data bit is defined by the width of each pulse.

27. The method of claim 26 wherein the phases of said clock signals are compared to produce an error signal indicative of the difference in rate between said clock signals.

28. The method of claim 26 and further comprising the step of recording the modulated signal on a recording medium.

29. A method of processing data, comprising the steps of:
receiving an incoming time-based data signal having an external clock rate as its time base;
generating an internal, variable clock rate signal;
comparing said internal clock rate signal with the external clock rate signal to produce an error signal indicative of the difference between said rates;
varying the rate of said internal clock rate signal to synchronize it with said external clock rate signal in response to said error signal; and
generating an output signal representative of said incoming data which is time-based on said synchronized internal clock rate signal, and wherein said incoming signal is a single-channel, self-clocked, ratio-encoded data signal recorded on a medium, and further comprising the steps of:
reading said incoming signal from the medium; and
converting said incoming signal into a dual-channel, parallel, clock rate and data signal.

* * * * *